Nov. 21, 1967  J. T. DEL VECCHIO ETAL  3,353,874
EXTENSIBLE SLIDE MECHANISM
Filed May 18, 1965
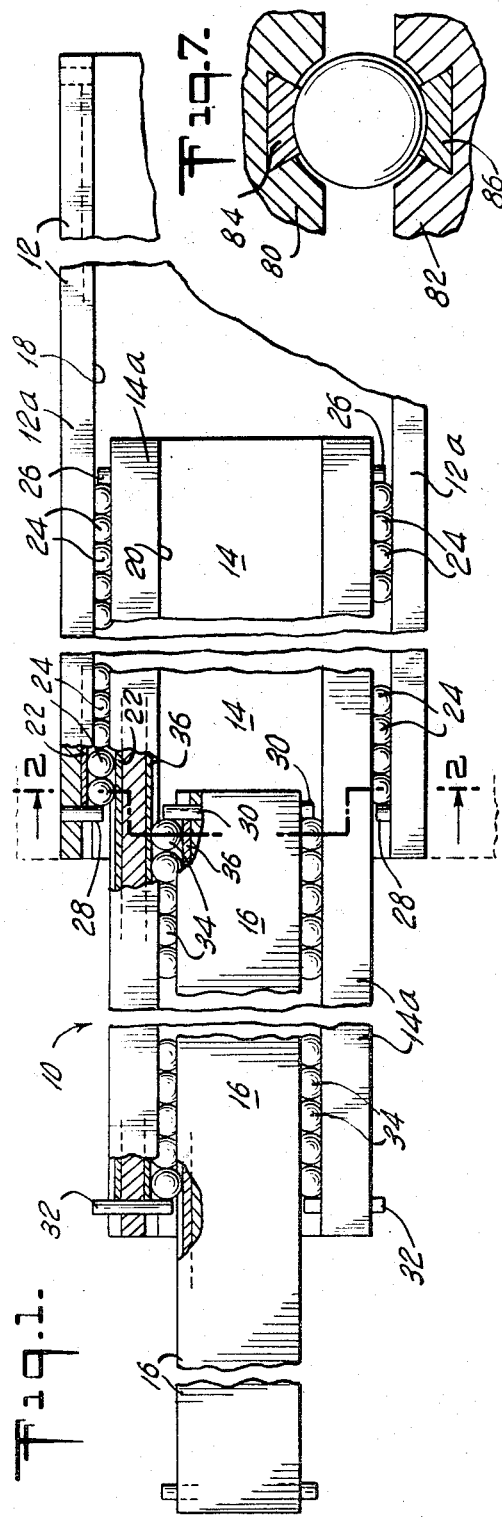
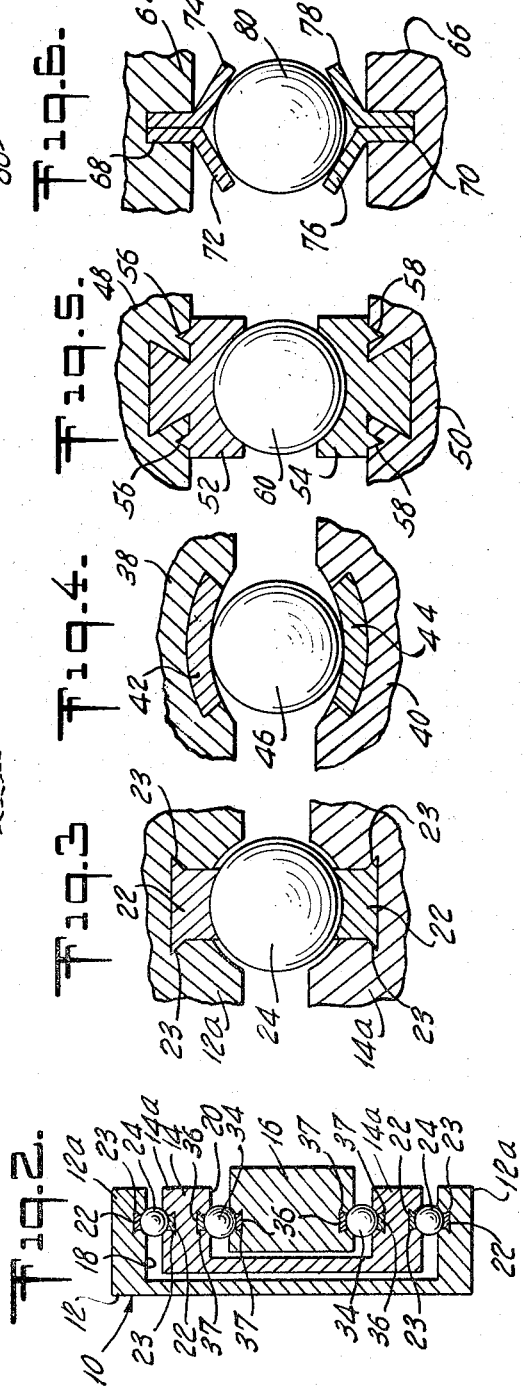
INVENTORS
JOSEPH T. DEL VECCHIO
CHARLES AGNOFF
BY
Lovette & Miskin
ATTORNEYS

United States Patent Office 3,353,874
Patented Nov. 21, 1967

3,353,874
EXTENSIBLE SLIDE MECHANISM
Joseph T. Del Vecchio, Nanuet, and Charles Agnoff, Plainview, N.Y., assignors to Grant Pulley & Hardware Corporation, West Nyack, N.Y., a corporation of New York
Filed May 18, 1965, Ser. No. 456,736
1 Claim. (Cl. 308—3.8)

ABSTRACT OF THE DISCLOSURE

A chassis for electronic equipment is mounted on a three-piece telescoping slide mechanism. The slide mechanism is provided with ball bearings between its moving members. The grooves of the slide, which form a raceway for the ball bearings, each have a hard metal insert. The overlapping relationship around the core. The core can its raceway groove, and has at least one outwardly extending flange adjacent its base to fix the insert in place.

---

The present invention relates generally to extensible slide assemblies for cabinets, chassis, drawers and the like, and more particularly to slide mechanisms for supporting equipment, such as electronic equipment, for movement into and out of a cabinet, which mechanism can be easily disassembled for access to or replacement of the chassis or equipment mounted thereon.

It is common practice in the electronic field to support a plurality of electronic chassis within a common cabinet, which chassis has electronic components mounted thereon and therein. These chassis could be also mounted on racks. These chassis are usually mounted upon a sliding support mechanism so that the chassis may be pulled out of the cabinet in a manner similar to that of a drawer. Frequently, it is necessary to remove an individual chassis or equipment for service and maintenance and completely replace the device or equipment in a minimum of time, and to delay repairing the equipment removed until a more convenient time. The sliding mechanisms used with this equipment are ordinarily of a telescoping type to save space, and normally include an outer member which is fastened to the cabinet or rack, an inner member which is fastened to the chassis and at least one intermediate member between the two. Suitable ball bearings are usually disposed between these telescoping members to provide free movement of the loaded chassis in extended position.

These sliding mechanisms are often required to support the weight of a relatively heavy chassis and yet must slide smoothly and easily to avoid jarring the equipment. This equipment is subject to shock when moved by truck, ship or aircraft, or under battle conditions. A large and unpredictable variation in load, shock and vibration must be satisfactorily withstood after the installation. Often a resonant frequency is set up during operation of the equipment itself. It is essential that the slide mechanisms must give adequate cycle life regardless of the field conditions in which the equipment is used.

Further, the chassis must be removable from the cabinet for service or replacement of the equipment and a replacement unit must have an innermost member compatible with the mounted slide assembly. This replacement operation should be simple and straightforward.

Additionally, the individual sections of a ball bearing slide mechanism must be fabricated to close tolerances to prevent side play in the final assembly.

It is therefore an object of this invention to strengthen the slide mechanism without increasing its dimensions to prevent Brinelling of the ball bearings and the ball races by virtue of shock or vibration.

A further object of the present invention is to provide a stronger slide mechanism within the same dimensional specifications heretofore used.

A still further object of the present invention is to provide a slide mechanism which permits ease of sliding movement of the sliding member and has a longer cycle life than heretofore obtained and which eliminates added attachments, such as shock locks or pick-up pins, heretofore used to reduce shock or vibration.

Another object of the present invention is to provide a slide mechanism of simple and economical construction but which is rugged and durable and which will support the chassis firmly at any position thereof relative to the supporting structure and which has long life.

Still another object of the present invention is to provide a slide mechanism which has accurate, hardened ball races with close tolerances to prevent play in the final assembly and transmit shock and vibration as a unitary assembly.

Other objects and advantages of the present invention will be readily apparent from the following description of the typical embodiments thereof as illustrated in the accompanying drawings, in which like parts throughout the several views bear identical reference numerals. In the drawings:

FIG. 1 is a side elevational view, partially broken away, of a slide mechanism embodying the invention, showing the mechanism in its extended position;

FIG. 2 is a cross-sectional view taken along line 2—2 of FIG. 1;

FIG. 3 is an enlarged, cross-sectional view showing one of the ball bearings of FIG. 2 in its races;

FIG. 4 is an enlarged, cross-sectional view of a ball bearing showing another embodiment of the present invention, similar to FIG. 3;

FIG. 5 is a view similar to FIG. 3 showing a different embodiment of the present invention;

FIG. 6 is a view similar to FIG. 3 of a further embodiment of the present invention; and FIG. 7 is a view similar to FIG. 3 of another embodiment of the present invention.

As shown in FIGS. 1 and 2, each slide mechanism 10 comprises a fixed or stationary section 12, an intermediate section 14, and a chassis or component supporting section 16.

Section 12 is generally rigidly fixed by screws or the like to the inside of a suitable cabinet or rack, not shown. Ordinarily a slide mechanism 10 is mounted on each side of the cabinet for each electronic component or chassis, but since these are usually identical, only one is shown.

Section 12 has a channel or slot 18 extending the length thereof, which slidably receives intermediate section 14. Section 14 is also formed with a longitudinal slot or channel 20 extending the length thereof, which telescopically receives chassis supporting section 16. Chassis supporting section 16 is rigidly secured by screws, bolts or the like to the drainer or chassis being supported.

Channel 18 in section 12 is formed within outwardly extending transverse arms or flanges 12a. Similarly channel 20 in section 14 is formed within outwardly extending transverse arms 14a. The facing surfaces of each of arms 12a of section 12 and of arms 14a of section 14 have a longitudinal slot cut or broached therein, in which is mounted a hardened insert 22 to receive ball bearings 24 therebetween. Inserts 22 are grooved along facing surfaces to provide races for ball bearings 24 to permit intermediate section 14 to move freely within stationary section 12. Advantageously, inserts 22 are hardened to provide a long wearing race for ball bearings 24 by cold drawing to the desired shape and dimension. Inserts 22 are generally rectangular with outwardly directed flanges 23 adjacent the base to firmly hold inserts 22 in their corresponding slots and for evenly transmitting the stress and shock from ball bearings 24 over a large area to arms 12a and 14a respectively. Hardened inserts 22 take the wear and points of stress concentration from the individual ball bearings 24 and resist pitting and ball Brinell. This allows arms 12a and section 12 to be made of a relatively softer material, such as aluminum or its alloys, which provides ease of machining precision parts.

In a similar manner the facing surfaces of arms 14a of section 14 and of section 16 have hardened inserts 36 with outwardly directed flanges 37 disposed in mating slots. Inserts 36 are cold drawn to provide the desired hardness, shape and dimensions, similar to inserts 22. Inserts 36 are grooved to form the ball races for ball bearings 34.

Adjacent the rear end of intermediate section 14 are a pair of pins 26 extending outwardly into channels 18 for limiting movement of ball bearings 24. Similarly extending outwardly from the forward end of section 12 into channel 18 are a pair of pins 28 for similarly limiting movement of ball bearings 24. In a similar manner, a pair of pins 30 are mounted adjacent the rear end of section 16 and a pair of pins 32 are mounted adjacent the forward end of section 14 which pins 30 and 32 extend transversely into channel 20 for preventing the escape of ball bearings 34. Pins 26 and 28 and pins 30 and 32 also serve to prevent longitudinal movement of their corresponding inserts.

In assembly mechanism 10, each slot is broached to obtain the close tolerances desired and the corresponding insert 22 or 36 is longitudinally forced into its slot. Each insert is cold drawn to obtain its desired finished dimension to mate with its corresponding slot.

A further embodiment is shown in FIG. 4 where a curved cut is broached in each of the facing surfaces of corresponding arms 38 and 40, shown fragmentarily. Tightly disposed within the cut in arm 38 is an insert 42 and disposed within the cut of arm 40 is an insert 44. The bases of inserts 42 and 44 mate with the surfaces of their corresponding cuts to form a tight fit. The facing surfaces of inserts 42 and 44 are curved to form a ball bearing race for ball bearings 46.

A further embodiment is shown in FIGURE 5 where a straight sided slot is cut or broached in the facing surfaces of arms 48 and 50, shown fragmentarily. Mounted in the slots of arms 48 and 50 are inserts 52 and 54 respectively, which have slightly tapered bases that are forced into its corresponding slot, thereby deforming the sides of the bases of the slots to secure the corresponding insert. Insert 52 has a pair of teeth or projections 56, which bite into the surface of arm 48 when insert 52 is pressed into its corresponding slot. Similarly, insert 54 has teeth 58 which bite into the surface of arm 50 when insert 54 is pressed fitted into its corresponding cut. The facing surfaces of inserts 52 and 54 are curved or grooved to form a race for ball bearings 60.

A further embodiment is shown in FIGURE 6 where facing arms 64 and 66 have longitudinally extending slots 68 and 70 respectively. Mounted within slot 68 are a pair of arms 72 and 74 having their bases in back-to-back relationship within slot 68. Arms 72 and 74 diverge exteriorly of slot 68 to form a raceway between the diverging arms 72 and 74. Similarly mounted in slot 70 are a pair of arms 76 and 78 respectively, with their bases back-to-back within slot 70. Ball bearing 80 is received between the diverging arms 72 and 74 and between diverging arms 76 and 78.

A further embodiment of the present invention is shown in FIGURE 7, wherein a dovetail slot is cut or broached in the facing surfaces of arms 80 and 82, shown fragmentarily. Mounted in the slot in arm 80 is an insert 84 having a shape mating with the slot and in the slot in arm 82 is an insert 86 with a shape mating with its corresponding slot. The dovetail shape provides a large area for transmission of shock to the slide, as well as being firmly positioned within its corresponding slot.

As shown in all of the embodiments, the inserts forming the ball bearing races are hardened and are mounted on the relatively softer material of the slides to form a race for the ball bearings. The inserts are preferably cold drawn to provide the hardened surface desired as well as the precise shape of the insert. These inserts are one piece and integrally mounted on the slides to spread the stress transmitted by the ball bearings to the softer slide material over wider areas, thereby materially reducing the unit stress carried by the softer material of the slides. These hardened inserts combined with the hardened ball bearings provide very close tolerance fit and eliminate the need for shock locks and pick-up pins heretofore used to reduce vibration and shock. Further, the present invention increases the strength of a slide of similar construction three to five times without a change in dimensions, so that a lighter duty slide can now handle heavier loads and applications resulting in a saving of space and money.

Also, while the description of the various embodiments of the present invention used as an example ball bearings, other bearings may be used, such as roller bearings, needle bearings or hardened rollers.

Thus, there has been provided an improved chassis slide mechanism capable of slidably supporting a heavier load with relative ease than present slides of the same dimensions. The slide mechanism even in extended position can support these loads without deformation or binding. The precision nature of the inserts in combination with the hardened steel balls provide almost a single structure to transmit shock and vibration directly from section 12 to section 16, and thus considerably reduces any amplification thereof.

While several embodiments of this invention have been illustrated and described herein, it will be apparent to those skilled in the art that various modifications thereof may be made. Accordingly, the particular details of construction previously set forth are not limitations thereof, but only for illustration of the inventive principles.

What is claimed is:

A slide mechanism comprising a series of telescoping slide sections, corresponding pairs of said sections having facing surfaces each of said surfaces having a longitudinally extending arcuately curved grooved therein with the grooves of corresponding pairs in superposed relation, each of said grooves having a longitudinally extending slot therein with the slots of corresponding pairs in superposed relation, said slots having at least one longitudinally extending indentation adjacent the base thereof, said slots being less wide than the arcuate width of said grooves, an insert matingly mounted within each of said slots said insert having a flat base and at least one longitudinally extending flange adjacent said base extending into said indentation, the width of said insert being less than the arcuate width of said groove, said inserts being harder than said sections, bearing elements between said corresponding pairs of inserts, and stop means mounted adjacent the ends of said sections abutting ends of corresponding inserts and limiting movement of said bearing elements.

References Cited

UNITED STATES PATENTS

| | | | |
|---|---|---|---|
| 879,982 | 2/1908 | Ross | 312—339 |
| 1,115,161 | 10/1914 | Berle | 248—430 |
| 1,500,116 | 7/1924 | Dowd | 179—69 |
| 2,513,522 | 7/1950 | Saniewski | 308—3.8 |
| 2,653,072 | 9/1953 | Press | 308—3.8 |
| 2,855,851 | 10/1958 | Shumen | 308—3.8 |
| 3,074,766 | 1/1963 | Meyer | 308—3.8 |

FOREIGN PATENTS

| | | |
|---|---|---|
| 609,836 | 8/1926 | France. |
| 701,924 | 1/1954 | Great Britain. |

MARTIN P. SCHWADRON, *Primary Examiner.*

L. L. JOHNSON, *Assistant Examiner.*